Dec. 7, 1937.  E. W. BREISCH  2,101,571
BATTERY CHARGING AND TESTING APPARATUS
Filed Feb. 12, 1934  3 Sheets-Sheet 1
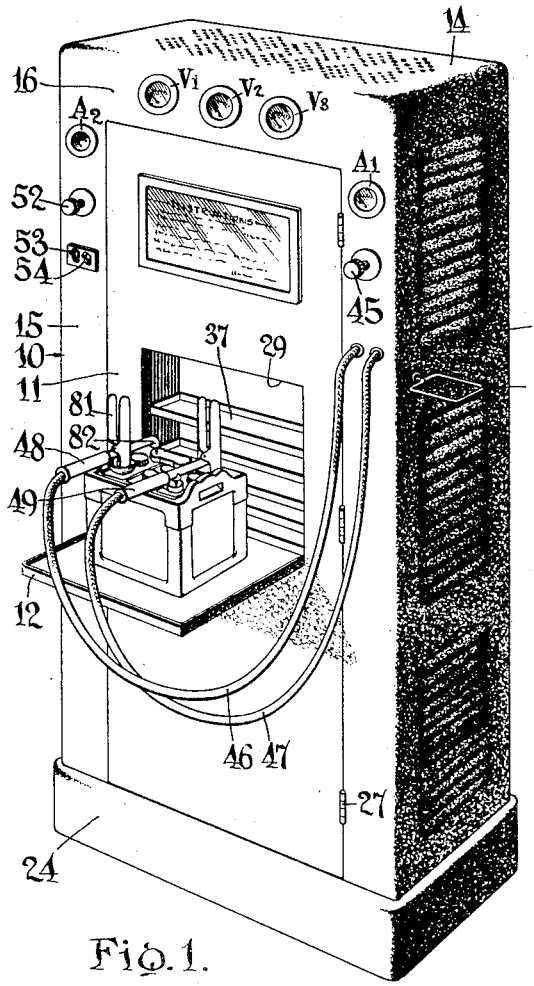
Fig.1.
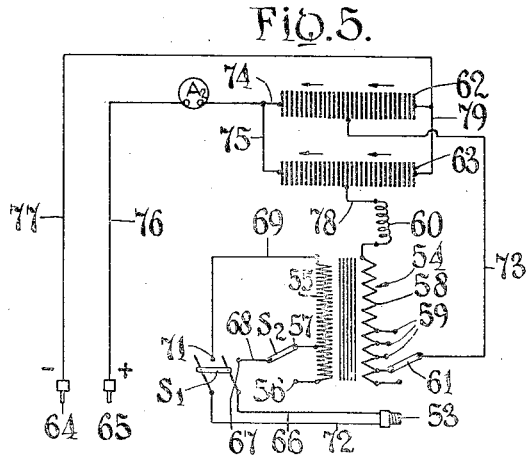
Fig.5.
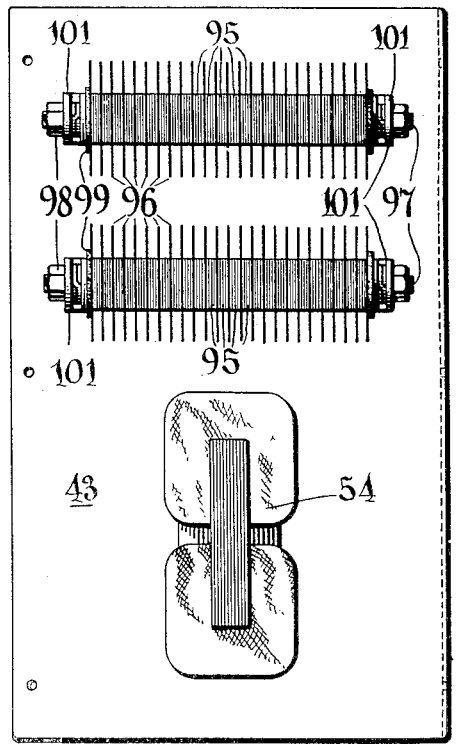
INVENTOR
Edgar W. Breisch,
BY
Bean & Brooks
ATTORNEYS Dec. 7, 1937. E. W. BREISCH 2,101,571
BATTERY CHARGING AND TESTING APPARATUS
Filed Feb. 12, 1934 3 Sheets-Sheet 2
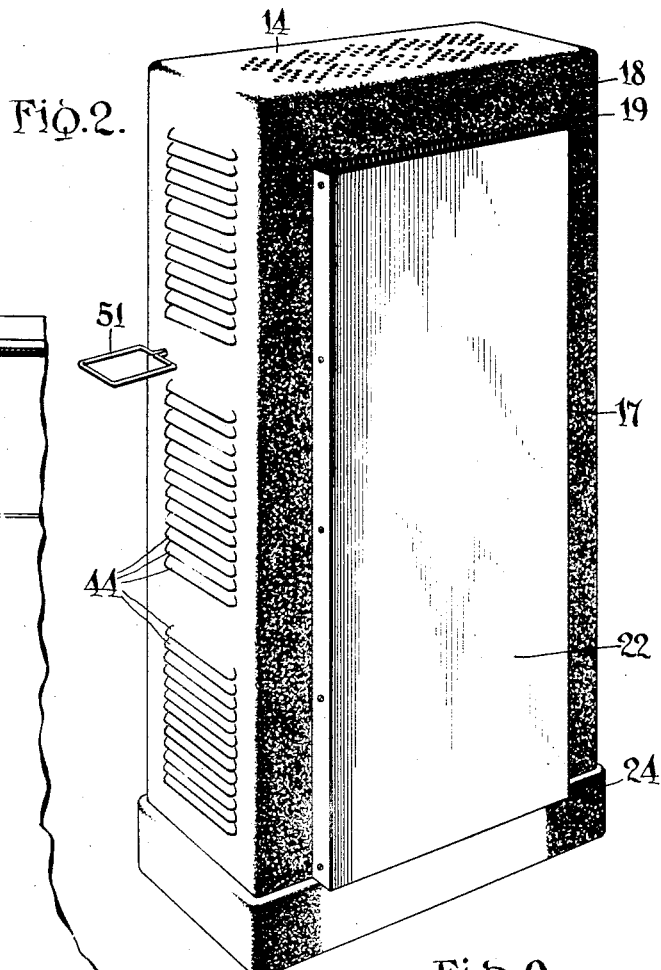
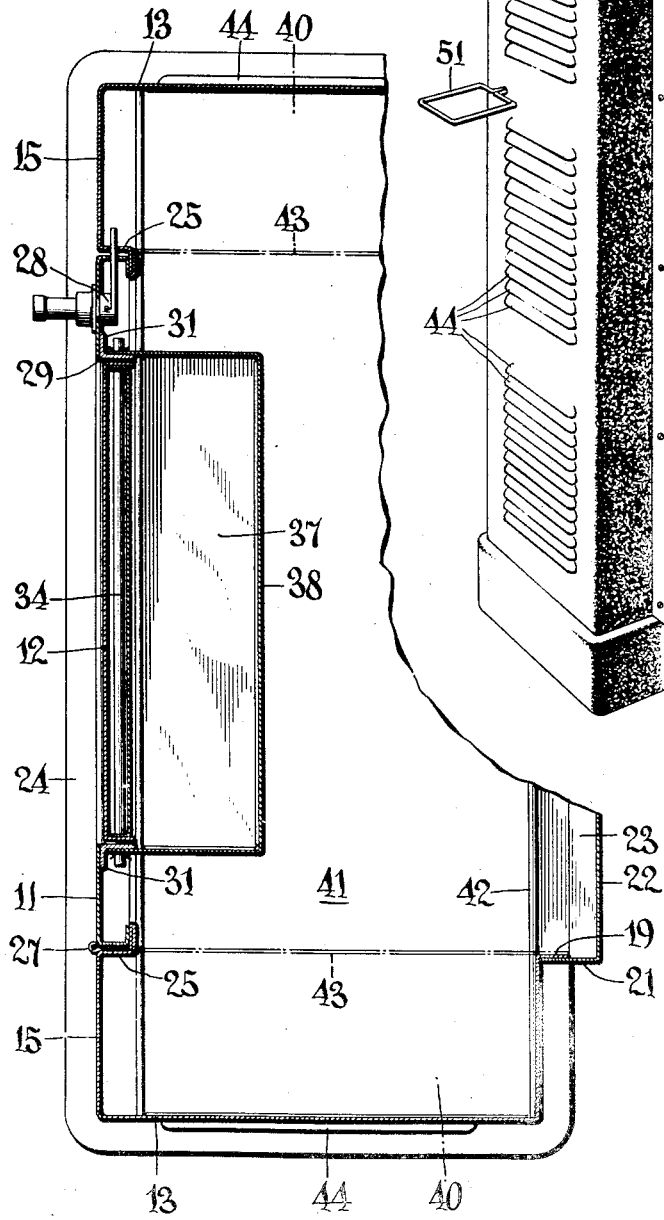
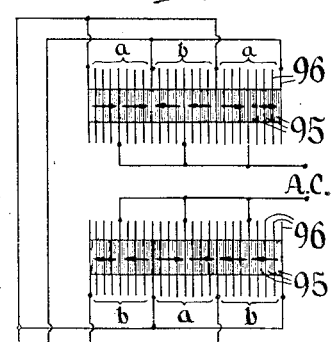
INVENTOR
Edgar W. Breisch,
BY Bean & Brooks
ATTORNEYS Dec. 7, 1937.  E. W. BREISCH  2,101,571
BATTERY CHARGING AND TESTING APPARATUS
Filed Feb. 12, 1934  3 Sheets-Sheet 3
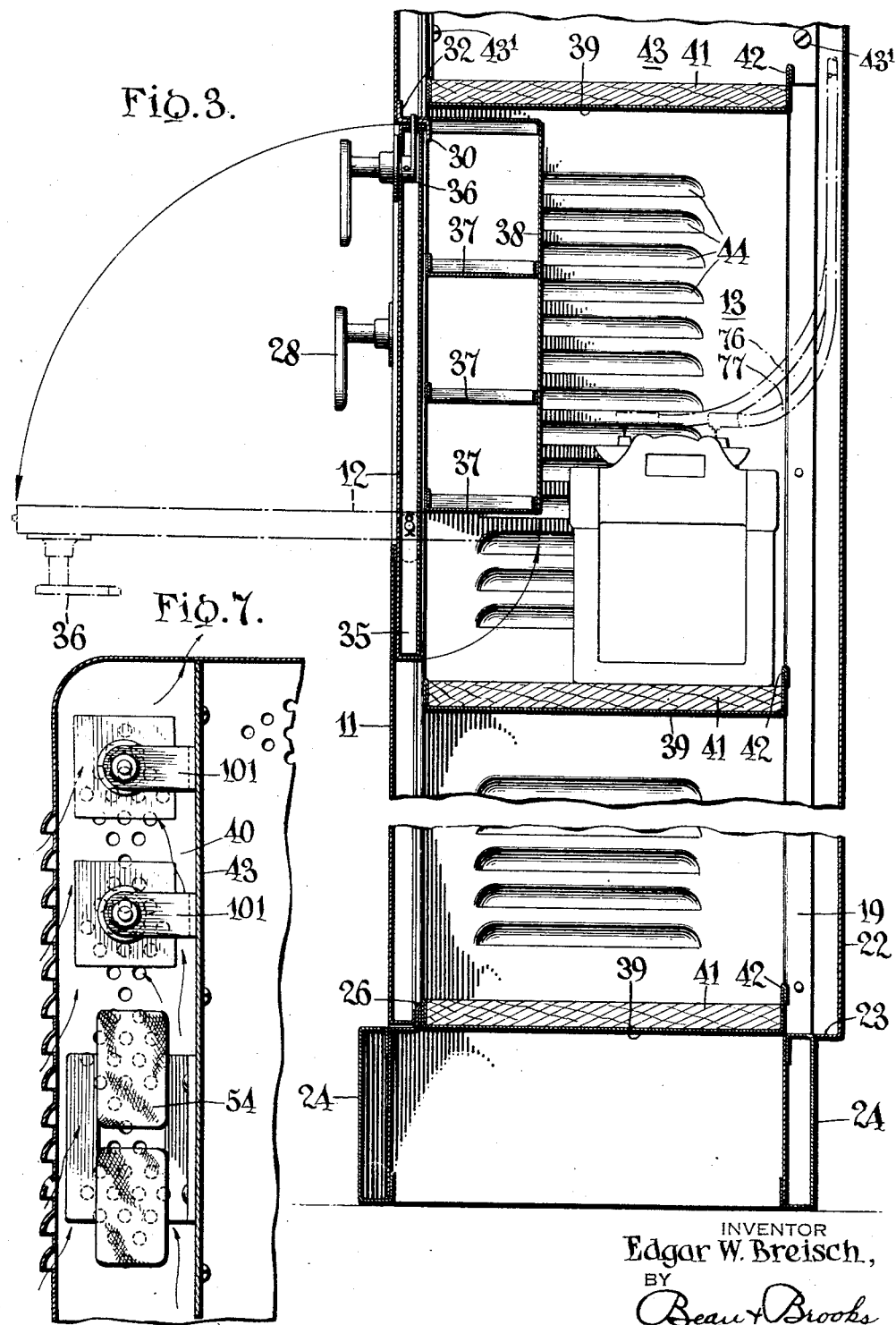
INVENTOR
Edgar W. Breisch,
BY
Beau & Brooks
ATTORNEYS Patented Dec. 7, 1937

2,101,571

UNITED STATES PATENT OFFICE 2,101,571

BATTERY CHARGING AND TESTING APPARATUS

Edgar W. Breisch, Lancaster, N. Y.

Application February 12, 1934, Serial No. 710,967

2 Claims. (Cl. 312—166)

The present invention relates to apparatus for charging and testing storage batteries, and contemplates a unitary structure for this purpose which is especially adapted for use in garages, repair shops, automobile and radio service stations, and the like.

In accordance with the invention, I provide a cabinet adapted to house batteries being charged or awaiting testing. Battery charging instrumentalities, including alternating current rectifying means, and testing instrumentalities, including a testing shelf are associated with the cabinet in such manner as to facilitate the charging and testing operations and to accomplish these with minimum effort. Further objects and advantages of the invention relate to the means for mounting the battery charging instrumentalities, including a current rectifying unit, upon and within the cabinet.

These and other objects and advantages, including those inherent in the arrangement and construction of the component parts, will become apparent from the following description of the preferred embodiment of the invention illustrated in the accompanying drawings, wherein:

Fig. 1 is a perspective view of the complete cabinet showing the front thereof;

Fig. 2 is a perspective view showing the rear of the cabinet;

Fig. 3 is a longitudinal vertical section through the cabinet;

Fig. 4 is a horizontal section taken through the cabinet at approximately the level of the door handle;

Fig. 5 is a diagram of the battery charging circuits;

Fig. 6 is a diagram of the discharge-testing circuits;

Fig. 7 is a fragmentary vertical section through the portion of the cabinet containing the alternating current rectifying means;

Fig. 8 is an elevational view of a panel which supports rectifying means shown in Fig. 7;

Fig. 9 is a diagram illustrating the wiring connection of a rectifier unit in the battery charging circuits.

As illustrated, the device includes a metallic cabinet 10 with the front wall thereof provided with a hinged door 11 and control and indicating instruments. Battery charging apparatus and battery supporting shelves are contained within the cabinet, and the door 11 carries a hinged shelf 12 for supporting batteries during testing operations.

The cabinet 10 comprises a sheet metal frame forming vertical side walls 13, 13 and horizontal upper wall 14. The forward edges of side walls 13, 13 and wall 14 are flanged to provide side and top portions 15 and 16, respectively, of the front wall of the cabinet. Like flanges on the rear edges of walls 13, 13 and 14 provide side portions 17 and upper portion 18 of the rear wall of the cabinet. Rearwardly directed flanges 19 on rear wall portions 17 are secured to forwardly directed flanges 21 of back wall panel 22. At the bottom edge of the latter is a flange 23 abutting the upper wall of molding 24, of generally channel cross-section, which extends around the bottom of and constitutes the base of the cabinet. As best shown in Fig. 3, a recess is provided at the lower rear of the cabinet by reason of the outward offsetting of panel 22, which enables the cabinet to fit against a wall having a baseboard or base molding. Flanges 25 are formed on the inner edges of front wall portions 15, 15 and 16 to delineate the opening and provide abutments for door 11, and a flanged member 26 is provided at the bottom of the door opening for like purpose.

Door 11 is a marginally flanged panel, supported at one vertical edge to the cabinet by hinges 27, the edge of the door opposite the hinges being provided with a handle and latch 28. A rectangular opening 29 is formed substantially centrally through the door, and secured to the latter at the vertical edges of the opening are angle members 31, and at the upper horizontal edge is an angle member 32 having a depending flange 30. The shelf 12, preferably formed of two marginally flanged metal plates spaced by their flanges, is pivoted by any suitable means such as rod 34 to the upright angle members 31, so that it may be moved, as shown in Fig. 3, from a vertical position wherein it provides a closure for the opening 29 in door 11, to a horizontal position wherein it may constitute a battery supporting shelf.

The bottom 35 of the hinged shelf 12 extends behind the portion of door 11 below opening 29 when the shelf is in upright or closed position, in which position it may be held by the handle operated latch 36 carried by the shelf. When in open or horizontal position, extension 35 of the shelf abuts the lowermost of a plurality of shelves 37 which are carried by the door 11 behind the opening 29. As shown in Figs. 3 and 4 shelves 37 are supported by a sheet metal casing 38, the ends of which are joined to the upright angle members 31, thus providing in door 11 a compartment for tools and like accessories to which access may be had upon lowering hinged shelf 12. By reason of extension of bottom 35 of hinged shelf 12 inwardly beyond hinge rod 34, any battery fluid or other waste which may be spilled on the shelf during testing of a battery, will, when the shelf is closed, drop inside of the cabinet, thereby precluding such waste from dripping on the front surface of the cabinet or door 11.

Extending horizontally across the cabinet interior behind door opening 29 are a plurality of battery supporting shelves 39. These comprise sheet metal panels secured at their ends to the side walls 13, 13 of the cabinet and covered with boards 41 of wood or acid-resisting composition. The shelf panels are flanged at their rear edges as indicated at 42 to provide a shoulder spaced from panel 22 of the back wall, for limiting rearward movement of batteries upon the shelves 39.

As shown in Fig. 7 and indicated by broken lines in Fig. 4, vertical metal partitions 43 extend between the uppermost shelf 39 and top 14 of the cabinet, being removably secured by means 43' at their front and rear edges to flanges 25 and 19, respectively, of the front and rear walls of the cabinet. In the compartments 40 thus formed at the upper side portions of the cabinet are mounting battery charging apparati to be described hereinafter.

A series of outwardly opening louvers 44 are formed in each side wall 13 of the cabinet, and series of ventilating openings are provided in upper wall 14 and in upper portion 18 of the rear wall. An opening is also provided at the rear of the cabinet by the spacing of the upper edge of rear panel 22 from wall portion 18.

Mounted on the upper front wall portion 16 of the cabinet are a plurality of voltmeters $V_1$, $V_2$, and $V_3$ for indicating the potential difference across each of the three cells of a storage battery being tested. Mounted on the front wall portion 15 to the right of door 11 are a high rate discharge ammeter $A_1$, and a control knob 45 for adjusting a carbon pile rheostat R arranged behind the front wall and in the testing discharge circuit. Beneath the knob 45 a pair of cables 46, 47 extend from the cabinet, carrying at their ends clamp members 48, 49 respectively, for engaging the terminals of a battery for testing purposes. When not in use the cables may be hung over the loop-shaped hanger 51 which is mounted at convenient height on side wall 13 of the cabinet.

Mounted on the front wall portion 15 to the left of door 11 are battery charging instrumentalities including a charging rate ammeter $A_2$, control knob 52, and levers 53, 54, respectively, of switches $S_1$ and $S_2$. The devices in the charging circuits are illustrated diagrammatically in Fig. 5, and include a plug 53 or other device for attachment to an alternating current source and a variable transformer 54 of which the primary winding 55 is tapped for connection to selective contacts 56 and 57 of the two position switch $S_2$. The secondary winding 58 of transformer 54 is tapped for connection to a plurality of contacts 59 for selective contact by contact arm 61, operated by knob 52. The apparatus in the charging circuits further includes one or more pairs of copper oxide rectifier stacks 62, 63 arranged with their low resistance directions extending as indicated by the arrows in Fig. 5, a reactance or loading coil 60, the charging rate ammeter $A_2$, and battery terminal connectors 64, 65. In primary circuit of the charging apparatus, the current may pass from one contact of plug 53 through wire 66, right arm of switch $S_1$, contact 67 of switch $S_1$, wire 68 to arm of switch $S_2$, contact 56 or 57 (depending upon the position of switch $S_2$), the primary winding of the transformer, and return to plug 53 via wire 69, contact 71 and left hand arm of switch $S_1$, and wire 72.

In the secondary circuit the current may pass on one phase from the secondary winding of the transformer from one contact 59, contact arm 61, wire 73 to the mid-point of copper oxide rectifier stack 62, through the pile in the direction of the arrow, wire 74, charging ammeter $A_2$, wire 76 to battery connector 65, through a battery being charged, battery connector 64, wires 77 and 79, rectifier stack 63 to the medial portion thereof, and return to secondary winding via wire 78 and reactance 60. On the opposite phase, current will pass from the secondary winding through reactance 60 and over wire 78 to the mid-point of rectifier stack 63, through the stack in the direction of the arrow, wire 75, ammeter $A_2$, through the battery to be charged, and return to secondary winding via wire 77, rectifier stack 62, wire 73, contact arm 61 and one contact 59.

The transformer and rectifier units are mounted, as shown in Figs. 7 and 8, upon removable panels 43 which constitute the inner vertical walls of compartments 40. Each rectifier unit comprises a stack of copper discs 95 oxidized on one face and spaced by discs of lead. At intervals in the stack are larger discs 96 which constitute cooling fins. The discs are compressed upon a rod 97 by nuts 98 threaded upon the ends of the rod, insulating discs 99 being provided adjacent the end discs 96 to prevent short circuiting. The stack units thus formed are mounted upon removable panel 43 by brackets 101, being arranged one beneath the other. The transformer 54 is also mounted upon one panel 43, and hence the rectifier units and transformer may be removed as a unit by taking out the panel. As shown by arrows in Fig. 7, the louvers 44 in wall 13 and vent openings in the top 15 of the cabinet provide for circulation of air directly over the transformer and rectifier units.

In the diagram Fig. 5, only two rectifier stacks 62 and 63, are illustrated, but it will be understood that a greater number may be used by arranging them in pairs of parallel units. Further, one stack may be divided electrically into a plurality of stacks. Such an arrangement is shown in Fig. 9, where the alternating current and direct current connections are made to the cooling discs 96 of rectifier stacks at intervals, so that each stack comprises a plurality of rectifying units arranged in parallel. As indicated in Fig. 9, a series of the discs of one stack labeled $a$ are reversed from other series of discs labeled $b$, so that direction of major current flow (the direction of least resistance) will be as indicated by the arrows.

Wires 76 and 77 in the form of insulated cables extend downwardly from the compartments 40 adjacent the rear panel 22, being adapted to be passed through spaces between the battery supporting shelves 39 and rear panel 22 to enable the terminal connectors 64, 65 to be connected to a battery on any one of the shelves.

Or, if a plurality of batteries supported on different shelves 39 are to be charged simultaneously contact 64 may be connected to the positive terminal of one battery, contact 65 to the negative terminal of a second battery, and a series connection provided between the negative terminal of the first battery and the positive terminal of the second battery. In this manner any number of batteries, within the capacity of the cabinet, may be connected in series for charging.

When switch $S_2$ closes against contact 57, the charging rate will be high by reason of the reduced effective number of turns of the primary winding of the transformer. By movement of switch $S_2$, through lever 54, to close against contact 56, the charging rate may be decreased. The potential across battery terminal connectors 64, 65 may also be varied, as for example to compensate for variation in the number of batteries being charged, by moving contact arm 61 through the medium of control knob 52. Thus if a single battery is to be charged, the voltage of the secondary charging circuit may be decreased to a minimum by moving contact arm 61 in a clockwise direction (Fig. 5) to contact the uppermost contact 59, and if the number of batteries in the charging circuit is increased, the arm 61 may be moved counter clockwise to increase the voltage, so as to maintain the desired potential drop across each battery being charged. The charging rate will, of course, be indicated by ammeter $A_2$, and an operator can adjust it to the desired degree by movement of switch lever 54 or control knob 52, or both.

The high rate discharge, testing apparatus provides means for indicating simultaneously the potential drop across each of the three cells of a battery to be tested under a given rate of discharge. The instrumentalities involved are indicated on the diagram, Fig. 6, where $A_1$ is the high rate discharge ammeter arranged in series with the carbon pile rheostat R, and the voltmeters $V_1$, $V_2$, and $V_3$, one for each cell of a battery to be tested, are arranged for connection across the cells of the battery. The battery connecting member 48 includes clamp 81 for engaging one post of the battery to be tested and a contact 82 for engaging the adjacent cell connector. Wires 83 and 91, respectively connected to clamp 81 and contact 82, are included in the cable 46 shown in Fig. 1. Likewise the post clamp and connector contact of connecting member 49 connect to wires 89 and 92, respectively, included in cable 47.

In operation of the testing circuits, current will pass from one post of the battery, clamp 81, wire 83, wire 87, carbon pile rheostat R, ammeter $A_1$, and wires 88 and 89 and clamp of member 49 to the other battery post, the rate of discharge being variable by adjustment of rheostat R through the medium of its control knob 45. Simultaneously the voltmeters $V_1$, $V_2$, and $V_3$ will register the potential drop across the terminals of each cell of the battery through the following circuits: Left post of battery, clamp 81, wire 83, voltmeter $V_1$, wire 91, contact 82 to the left cell connector of the battery; left connector of the battery contact 82, wire 91, voltmeter $V_2$, wire 92, contact of member 49 to the right cell connector; and right cell connector, wire 92, voltmeter $V_3$, wire 89, to the clamp on the right post of the battery.

In utilization of the charging cabinet, the hinged shelf may be lowered to provide access to the tool compartment carried by the door and including shelves 37, or for supporting a battery to be tested. Door 11 may, of course, be opened either when the hinged shelf is in closed position or is open and is supporting a battery, and a battery may thus be moved directly from the hinged shelf to one of the shelves 39, or vice versa, in one lifting operation. During the charging operation, the door 11 and hinged shelf may be closed to completely conceal the batteries and charging apparatus, sufficient ventilation of the cabinet interior being provided by the passage of air into the cabinet louvers 44, and exhaust through openings in upper wall 14 and rear wall portion 18 and through the opening at the top of rear panel 22. Any corrosive fumes arising from the batteries being charged are prevented from enveloping the testing and charging apparatus, and particularly the copper oxide rectifier stacks, by reason of the walls 43 which separate the compartments from the remaining cabinet interior, and by reason of the upper louvers, and extreme right and left hand openings in the cabinet top 14 which provide for an independent circulation of air through compartments 40. It will be understood that the cabinet with charging and testing apparatus housed therein, is especially adapted for use in garages, automobile and radio service stations, and other places where battery charging and testing equipment is desired and where the space available for such equipment is limited.

In the alternating current rectifying system disclosed in connection with Fig. 5, the voltage across the battery connectors 64, 65 may be varied, by adjustment of the contact arm 61, to compensate for increase or decrease of the number of batteries being charged.

It will be understood further, that the devices herein described constitute merely an illustrative application of the inventive principles involved, which may be embodied in other structural forms and arrangements without departing from the spirit and scope of the invention as claimed.

What is claimed is:

1. In battery charging apparatus, a cabinet having a door opening in the front wall thereof and an outwardly offset panel on the rear wall thereof, a hinged closure for the door opening, a plurality of battery supporting shelves in said cabinet extending across the interior thereof and spaced from said outwardly offset panel, a pair of vertical partitions extending between the uppermost one of said shelves and the top wall of the cabinet and between the front and rear walls of the cabinet to provide compartments for battery charging apparatus, and ventilating openings for the interior of the cabinet formed in the side and top walls of the cabinet, other ventilating openings for said compartments formed in said side and top walls, and the upper edge of said outwardly offset panel being spaced from the adjacent rear wall portion of the cabinet to provide a ventilating opening adjacent the top of the cabinet.

2. In a battery charging apparatus, a cabinet having top, front, rear and side walls, the front wall having a door opening and a door for the opening hinged thereto, a plurality of battery supporting shelves in said cabinet extending across the interior thereof and engaging the side and rear walls, a portion of the rear wall being outwardly offset to provide at the upper end thereof a ventilating opening and to provide spaces between the rear edges of the battery supporting shelves and a portion of the rear wall, and a vertical partition extending between the top wall and the uppermost battery supporting shelf and between the front and rear walls to define a compartment for battery charging apparatus isolated from the remaining cabinet interior.

EDGAR W. BREISCH.